United States Patent
Yasuhara et al.

(10) Patent No.: US 11,686,965 B2
(45) Date of Patent: Jun. 27, 2023

(54) LIGHT CONTROL SHEET, LIGHT CONTROL DEVICE, AND METHOD OF CONTROLLING THE LIGHT CONTROL SHEET

(71) Applicant: TOPPAN Inc., Tokyo (JP)

(72) Inventors: Toshiji Yasuhara, Taito-ku (JP); Takehiro Yamada, Taito-ku (JP)

(73) Assignee: TOPPAN Inc., Tokyo (JP)

(\*) Notice: Subject to any disclaimer, the term of this patent is extended or adjusted under 35 U.S.C. 154(b) by 0 days.

(21) Appl. No.: 17/563,154

(22) Filed: Dec. 28, 2021

(65) Prior Publication Data

US 2022/0121047 A1  Apr. 21, 2022

Related U.S. Application Data

(63) Continuation of application No. PCT/JP2020/024046, filed on Jun. 18, 2020.

(30) Foreign Application Priority Data

Jun. 28, 2019 (JP) .............................. JP2019-121808

(51) Int. Cl.
*G02F 1/1334* (2006.01)
*G02F 1/133* (2006.01)
*G02F 1/1343* (2006.01)
*G02F 1/137* (2006.01)

(52) U.S. Cl.
CPC ............ *G02F 1/1334* (2013.01); *G02F 1/137* (2013.01); *G02F 1/13306* (2013.01); *G02F 1/134309* (2013.01); *G02F 2203/01* (2013.01)

(58) Field of Classification Search
CPC ............... G02F 1/1334; G02F 1/13306; G02F 1/134309
See application file for complete search history.

(56) References Cited

U.S. PATENT DOCUMENTS

| | | | |
|---|---|---|---|
| 5,437,811 A * | 8/1995 | Doane | C09K 19/542 349/86 |
| 5,486,937 A | 1/1996 | Yano et al. | |
| 2003/0016905 A1* | 1/2003 | Kondoh | G02F 1/315 349/196 |

(Continued)

FOREIGN PATENT DOCUMENTS

| | | |
|---|---|---|
| JP | 02-310522 A | 12/1990 |
| JP | 05-107562 A | 4/1993 |

(Continued)

OTHER PUBLICATIONS

International Search Report dated Jul. 14, 2020 in PCT/JP2020/024046, filed Jun. 18, 2020, 5 pages (with English Translation).

*Primary Examiner* — Lucy P Chien
(74) *Attorney, Agent, or Firm* — Oblon, McClelland, Maier & Neustadt, L.L.P.

(57) ABSTRACT

A light control sheet including a light control layer switchable between a transparent state and an opaque state, and transparent electrode layers sandwiching the light control layer. The light control layer includes a transparent polymer layer that has domains whose average size is 1.0 µm-1.55 µm, and the light control layer includes a liquid crystal composition at a concentration of 37%-55% such that the liquid crystal composition fills the domains.

20 Claims, 6 Drawing Sheets

(56) References Cited

U.S. PATENT DOCUMENTS

2017/0090237 A1\* 3/2017 Kim .................... G02F 1/13471
2017/0351155 A1\* 12/2017 Paolini, Jr. ................. C08J 7/18

FOREIGN PATENT DOCUMENTS

| JP | 2000-321562 A | 11/2000 |
| JP | 2017-223950 A | 12/2017 |
| JP | 2018-031870 A | 3/2018 |
| JP | 2018-091986 A | 6/2018 |
| JP | 6493598 B1 | 4/2019 |

\* cited by examiner

LIGHT CONTROL SHEET, LIGHT CONTROL DEVICE, AND METHOD OF CONTROLLING THE LIGHT CONTROL SHEET

CROSS-REFERENCE TO RELATED APPLICATIONS

The present application is a continuation of International Application No. PCT/JP2020/024046, filed Jun. 18, 2020, which is based upon and claims the benefits of priority to Japanese Application No. 2019-121808, filed Jun. 28, 2019. The entire contents of all of the above applications are incorporated herein by reference.

BACKGROUND OF THE INVENTION

Field of the Invention

The present invention relates to light control sheets, light control devices, and methods of controlling light control sheets.

Discussion of the Background

Light control sheets include a polymer layer that contains a liquid crystal composition. Light control sheets change their state between a transparent state and an opaque state depending on the voltage applied to the polymer layer (e.g., see PTL 1). Such light control sheets can be categorized into normal type and reverse type. Normal type light control sheets are opaque when not energized and transparent when a voltage is applied. Reverse type light control sheets are transparent when not energized and opaque when a voltage is applied (e.g., see PTL 2).

Physical properties that are known to measure opacity of light control sheets include haze (JIS K 7136:2000), transmitted image sharpness (JIS K 7374:2007), and clarity (e.g., see PTLs 3 and 4). In particular, opacity of light control sheets in terms of whether the contours of an object can be perceived through them is required to be determined based on transmitted image sharpness or clarity.

PTL 1: JP 2018-091986 A
PTL 2: JP 2000-321562 A
PTL 3: JP 2018-031870 A
PTL 4: JP 6493598 B

SUMMARY OF THE INVENTION

According to an aspect of the present invention, a light control sheet includes a light control layer switchable between a transparent state and an opaque state, and transparent electrode layers sandwiching the light control layer. The light control layer includes a transparent polymer layer that has domains whose average size is 1.0 µm-1.55 µm, and the light control layer includes a liquid crystal composition at a concentration of 37%-55% such that the liquid crystal composition fills the domains.

According to another aspect of the present invention, a method of controlling a light control sheet including a light control layer includes testing an operational status of the light control layer. The light control sheet includes the light control layer switchable between a transparent state and an opaque state, and transparent electrode layers sandwiching the light control layer. The light control layer includes a transparent polymer layer that has domains in which a liquid crystal composition is filled. The testing includes detecting whether the liquid crystal composition in the light control layer has a concentration of 37%-55%, and the domains have an average size of 1.0 µm-1.55 µm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A-E are a set of images in which—each show an example of a transmitted image.

DESCRIPTION OF THE EMBODIMENTS

The embodiments will now be described with reference to the accompanying drawings, wherein like reference numerals designate corresponding or identical elements throughout the various drawings.

Referring to FIGS. 1 to 10, an embodiment of a light control sheet, a light control device, and a method of controlling the light control sheet will be described. In the present embodiment, an object present on an opposite side to the observation point via a light control sheet is referred to as an observation target. The observation target includes, for example, moving objects such as persons, and stationary objects such as devices or objets d'art.

<Light Control Sheet>

Light control sheets are attached, for example, to windows of moving objects, such as vehicles or aircraft. Also, light control sheets are attached, for example, to windows of buildings, such as houses, stations and airports, partitions used in offices, and display windows used in stores. Furthermore, light control sheets are used as screens on which images are projected.

Light control sheets may have a flat surface or curved surface. Light control sheets may have a shape matching the shape of an object to which they are attached, or may have a shape different from the shape of an object to which they are attached. Light control sheets may be of a normal type or reverse type.

Figure 1:
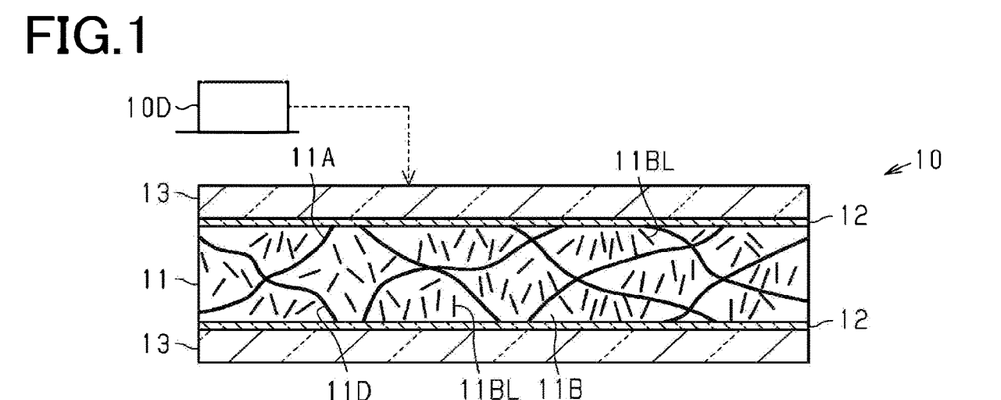
FIG. 1 is a cross-sectional view illustrating a normal type light control sheet in a state in which no voltage is applied.
Figure 2:
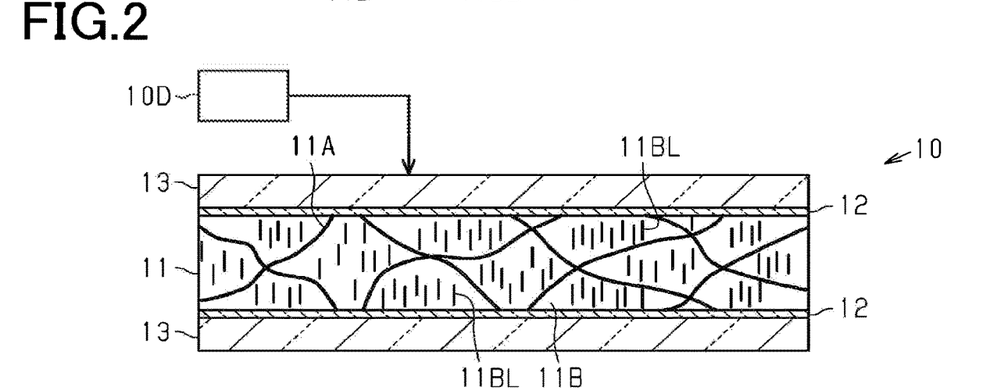
FIG. 2 is a cross-sectional view illustrating a normal type light control sheet in a state in which a voltage is applied.

Referring to FIGS. 1 and 2, a normal type light control sheet and a light control device provided with the normal type light control sheet will be described. FIG. 1 shows a cross-sectional structure of a normal type light control sheet in an opaque state. FIG. 2 shows a cross-sectional structure of a normal type light control sheet in a transparent state.

As shown in FIG. 1, a normal type light control sheet 10 includes a light control layer 11 and two transparent electrode layers 12. The light control layer 11 includes a transparent polymer layer containing a plurality of domains, and a liquid crystal composition filling the plurality of domains.

One retention type for a liquid crystal composition is selected from the group consisting of a polymer network type, a polymer dispersion type, and a capsule type. The polymer network type includes a polymer network having a three-dimensional mesh. The polymer network retains a liquid crystal composition in mesh-like voids communicating with each other. The polymer dispersion type includes a polymer layer in which numerous isolated voids are defined, and a liquid crystal composition is retained in the voids distributed in the polymer layer. The capsule type includes a polymer layer in which a liquid crystal composition is retained in capsules.

The domains correspond to the voids formed in a polymer network, the isolated voids dispersed in a polymer layer, or the capsules dispersed in a polymer layer. The domains may each be a void enclosed by a transparent polymer, or may each be a void connected to adjacent domains. The light control sheets shown in FIGS. 1 to 4 are examples of the network type retention.

As shown in FIG. 1, the light control layer 11 contains a polymer network 11A and a liquid crystal composition 11B as an example of a transparent polymer layer. The polymer network 11A defines a plurality of domains 11D. Each domain 11D is a void connected to adjacent domains 11D. The light control layer 11 is formed, for example, by irradiating a coating film with UV light. The coating film is a mixture of a UV polymerizable compound for forming the polymer network 11A with the liquid crystal composition 11B.

The polymer network 11A is a polymer of a UV polymerizable compound. The polymer network 11A may include spacers for maintaining the thickness of the light control layer 11. The spacers may be, for example, glass particles or resin particles, and these particles are preferred to have the same color as that of the light control layer 11.

The liquid crystal composition 11B contains liquid crystal molecules 11BL. The liquid crystal composition 11B are filled in the domains 11D. For example, the liquid crystal molecules 11BL may be molecules of one material selected from the group consisting of Schiff base, azo, azoxy, biphenyl, terphenyl, benzoic acid ester, tolan, pyrimidine, cyclohexanecarboxylic acid ester, phenylcyclohexane, and dioxane types. Main components of the liquid crystal composition 11B are the liquid crystal molecules 11BL.

The main components of the liquid crystal composition 11B have a mass concentration that is 80% or more relative to the liquid crystal composition 11B. Other than the main components, the liquid crystal composition 11B may contain a dichroic pigment, anti-weathering agent, and inevitable components mixed in during formation of the light control layer 11. The anti-weathering agent is a UV absorber or light stabilizer for minimizing deterioration of the liquid crystal composition 11B. The inevitable components may be, for example, unreacted components of the UV polymerizable compound used for forming the polymer network 11A.

If each domain 11D has a circular shape in a cross-sectional structure of the light control sheet 10, the domain size is the diameter of the domain 11D. If each domain 11D has an elliptical shape in a cross-sectional structure of the light control sheet 10, the domain size is the major diameter of the domain 11D. If each domain 11D has an indefinite shape in a cross-sectional structure of the light control sheet 10, the domain size is the diameter of a circle circumscribing the domain 11D. An average domain size is an average of domain sizes.

The two transparent electrode layers 12 sandwich the light control layer 11 in the thickness direction of the light control layer 11. The transparent electrode layers 12 transmit light in the visible light region. The material forming the transparent electrode layers 12 may be, for example, one selected from the group consisting of indium tin oxide, fluorine-doped tin oxide, tin oxide, zinc oxide, carbon nanotubes, and poly(3, 4-ethylenedioxythiophene).

The light control sheet 10 includes two transparent substrates 13. The two transparent substrates 13 sandwich the two transparent electrode layers 12 in the thickness direction of the light control layer 11. The transparent substrates 13 transmit light in the visible light region. The material forming the transparent substrates 13 may be, for example, transparent glass, a transparent synthetic resin, or the like.

The light control layer 11 has a transparent state and an opaque state. The light control layer 11 changes the alignment of the liquid crystal molecules 11BL in response to the application of a voltage. The light control layer 11 changes state between a transparent state and an opaque state based on the change of alignment of the liquid crystal molecules 11BL. The transparent state of the light control layer 11 is a state in which the contours of an observation target can be visually perceived through the light control sheet 10. The opaque state of the light control layer 11 is a state in which the contours of an observation target cannot be visually perceived through the light control sheet 10.

The light control sheet 10 shown in FIG. 1 is in a state in which no voltage for changing the alignment is applied. When no voltage for changing the alignment is applied to the light control layer 11, the liquid crystal molecules 11BL in the domains 11D are randomly oriented. Accordingly, the light that is incident on either of the two transparent substrates 13 and enters the light control sheet 10 is scattered in various directions in the light control layer 11. Consequently, the normal type light control layer 11 is in an opaque state, that is a turbid state, when no voltage is applied thereto. The opaque state of the light control layer 11 may be a white turbid state or a colored turbid state. If the opaque state of the light control layer 11 is a colored turbid state, the light control layer 11 contains a pigment for presenting the color.

When the light control layer 11 is in an opaque state, the transmitted image sharpness of the light control sheet 10 is 47% or less. The transmitted image sharpness is based on JIS K 7374:2007 with the optical comb width set to 0.125 mm. If the transmitted image sharpness of the light control sheet 10 is 47% or less, the light control sheet 10 can sufficiently make the contours of the observation target visually imperceptible.

When the light control layer 11 is in an opaque state, the light control sheet 10 has a clarity of 71% or less. If the clarity of the light control sheet 10 is 71% or less, an effect equivalent to the effect achieved when the transmitted image sharpness of the light control sheet 10 is 47% or less can be achieved.

When the light control layer 11 is in an opaque state, the light control sheet is preferred to have a haze of 95% or more according to JIS K 7136:2000. Thus, in addition to the contours of an observation target being made visually imperceptible, the presence of the observation target can be made visually imperceptible.

As shown in FIG. 2, when a voltage for changing the alignment of the liquid crystal molecules 11BL is applied to the light control layer 11 using a drive circuit 10D, the alignment of the liquid crystal molecules 11BL that was previously random changes into an alignment allowing light to be transmitted therethrough. For example, the alignment of the liquid crystal molecules 11BL changes such that the long axes of the liquid crystal molecules 11BL are substantially perpendicular to the plane in which the light control layer 11 is provided. In this case, the light that is incident on either of the two transparent substrates 13 and enters the light control sheet 10 passes through the light control layer 11 without substantially being scattered therein. Consequently, the normal type light control layer 11 is brought into a transparent state when a voltage is applied thereto.

Figure 3:
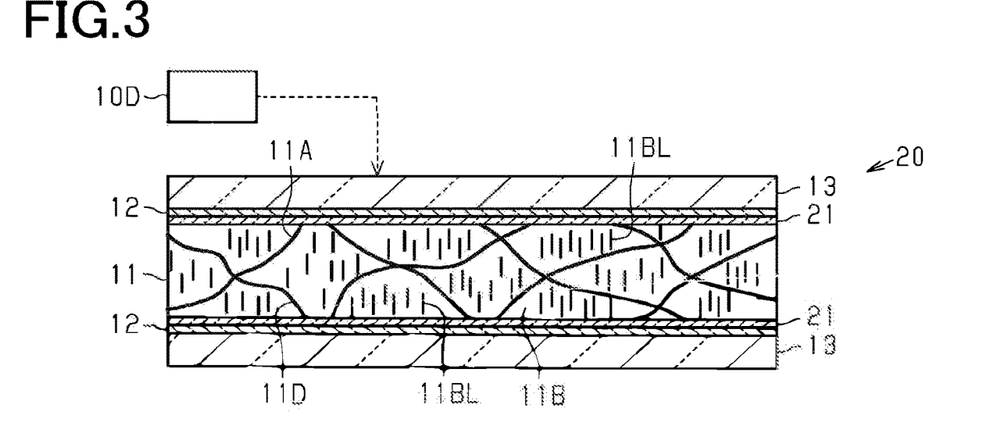
FIG. 3 is a cross-sectional view illustrating a reverse type light control sheet in a state in which no voltage is applied.
Figure 4:
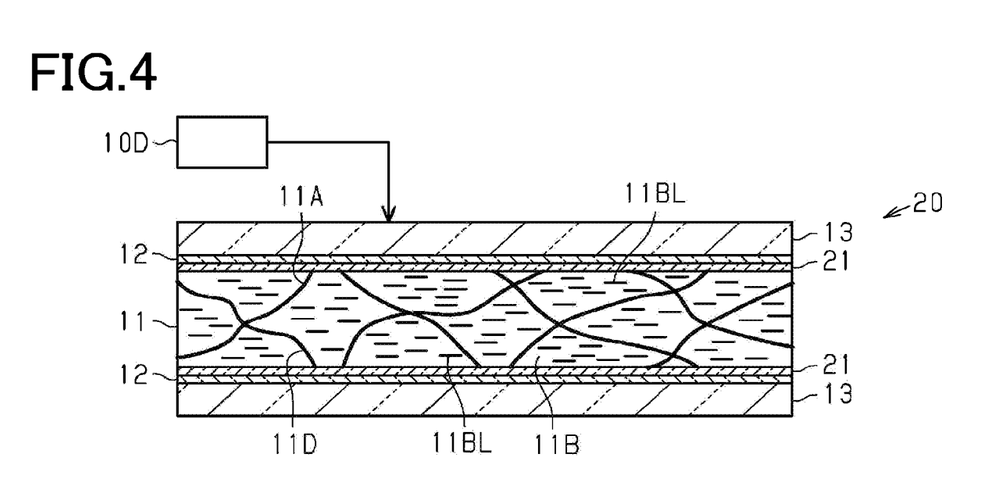
FIG. 4 is a cross-sectional view illustrating a reverse type light control sheet in a state in which a voltage is applied.

Referring to FIGS. 3 and 4, a reverse type light control sheet and a light control device provided with the reverse type light control sheet will be described. FIG. 3 shows a cross-sectional structure of a reverse type light control layer 11 in a transparent state. FIG. 4 shows a cross-sectional structure of the reverse type light control layer 11 in an opaque state.

As shown in FIG. 3, a reverse type light control sheet 20 includes two alignment layers 21, in addition to the light control layer 11, two transparent electrode layers 12, and two transparent substrates 13. The two alignment layers 21 sandwich the light control layer 11 in the thickness direction of the light control layer 11, and are positioned closer to the center portion than are the two transparent electrode layers 12 in the thickness direction of the light control layer 11.

A first alignment layer 21 is located between the light control layer 11 and a first transparent electrode layer 12 to apply an alignment regulating force to the liquid crystal molecules 11BL. A second alignment layer 21 is located between the light control layer 11 and a second transparent electrode layer 12 to apply an alignment regulating force to the liquid crystal molecules 11BL. The material forming the alignment layers 21 may be, for example, polyimide, polyamide, polyvinyl alcohol, an organic compound such as cyanide compound, an inorganic compound such as silicon oxide and zirconium oxide, silicone, or a mixture of these materials.

When the alignment layers 21 are vertical alignment layers and no voltage for changing the alignment of the liquid crystal molecules 11BL is applied to the light control layer 11, the liquid crystal molecules 11BL in the domains 11D are vertically aligned. In this case, the light that is incident on either of the two transparent substrates 13 and enters the light control sheet 20 passes through the light control layer 11 without substantially being scattered therein. Consequently, the reverse type light control layer 11 is brought into a transparent state when no voltage for changing the alignment of the liquid crystal molecules 11BL is applied thereto.

As shown in FIG. 4, when a voltage for changing the alignment of the liquid crystal molecules 11BL is applied to the light control layer 11 using a drive circuit 10D, the alignment of the liquid crystal molecules 11BL that was previously vertical changes, for example, into a horizontal alignment. In this case, the liquid crystal molecules 11BL are positioned in the domains 11D such that the long axes of the liquid crystal molecules 11BL are extended parallel to the plane in which the light control layer 11 is provided. In this case, the light that is incident on either of the two transparent substrates 13 and enters the light control sheet 20 is scattered by the light control layer 11. Consequently, the reverse type light control layer 11 is brought into an opaque state when a voltage for changing the alignment of the liquid crystal molecules 11BL is applied thereto.

In the reverse type light control sheet 20, transmitted image sharpness and clarity are similar to those of the normal type light control sheet 10. Specifically, when the light control layer 11 is in an opaque state, the light control sheet 20 has a transmitted image sharpness of 47% or less according to JIS K 7374:2007 with the optical comb width set to 0.125 mm. When the light control layer 11 is in an opaque state, the light control sheet 20 has a clarity of 71% or less. It should be noted that when the light control layer 11 is in an opaque state, the light control sheet 20 is preferred to have a haze of 95% or more according to JIS K 7136: 2000.

Transmitted image sharpness and clarity are greatly affected by the degree of narrow-angle scattering occurring in the light control sheet 10 or 20. As mentioned above, it remains unexplained how transmitted image sharpness and clarity are affected by the components of the light control layer 11.

The values of transmitted image sharpness and clarity tend to become smaller as the voltage applied to the light control layer 11 decreases in a normal type light control layer 11. Also, the values of transmitted image sharpness and clarity tend to become smaller as the voltage applied to the light control layer 11 increases in a reverse type light control layer 11. Light control devices on which light control sheets 10 or 20 are mounted are required to have predetermined opacity. Therefore, the voltage applied to the light control sheets 10 or 20 is controlled so that transmitted image sharpness and clarity will have predetermined values. However, opacity control based on the change of applied voltage involves use of drive circuits 10D having complicated structures which require complicated initial setting, and causes great variation in power consumption of the light control devices.

In this regard, the inventors of the present invention found that transmitted image sharpness and clarity are minimized if an average domain size is reduced when the concentration of a liquid crystal composition is in a predetermined range. Specifically, the inventors of the present invention found that, if the following requirement 1 is satisfied, minimum values of transmitted image sharpness and clarity reside in the vicinity of the center of an average domain size range shown by the following requirement 2. The light control sheet 10 or 20 of the present embodiment preferably satisfies the following requirements 1 and 2.

(Requirement 1) The concentration of the liquid crystal composition is 37% or more and 55% or less.

(Requirement 2) The average domain size is 1.0 μm or more and 1.55 μm or less.

The concentration of the liquid crystal composition is a weight ratio of the liquid crystal composition 11B to the light control layer 11. The concentration of the liquid crystal composition is a parameter substantially corresponding to a mixing ratio of the liquid crystal molecules 11BL in the light control layer 11. The concentration of the liquid crystal composition is a parameter related to the density of elements contributing to the opacity of the light control sheet 10 or 20. Each element contributing to the opacity of the light control sheet 10 or 20 is a piece of liquid crystal composition 11B filling one domain 11D.

For the elements contributing to the opacity of the light control sheet 10 or 20 satisfying the requirements 1 and 2, the quantity of the elements per unit volume and the size of each element can be approximately specified. It should be noted that if the concentration of the liquid crystal composition is 37% or more, contrast between the transparent state and the opaque state can be sufficiently achieved. Also, if the concentration of the liquid crystal composition is 55% or less, the liquid crystal composition can be sufficiently dissolved in a monomer forming the polymer network 11A.

In addition, in the vicinity of the center of the average size range shown by the requirement 2, transmitted image sharpness and clarity can have minimum values. Thus, a large number of domains 11D, even if they are varied in size, can be easily distributed, satisfying the above requirements for achieving opacity. The requirements for achieving opacity include that the number of domains 11D and the average size of domains 11D per unit volume are in predetermined ranges. Consequently, the light control sheet 10 or 20 can achieve opacity that makes the contours of an observation target visually imperceptible, and can minimize the opacity variation. Thus, voltage can be controlled to achieve opacity that makes the contours of an observation target visually imperceptible, and furthermore, the structure and the initial setting of the drive circuit 10D can be prevented from becoming complicated. Also, the voltage applied to the light control sheet 10 or 20 can be uniformed, minimizing variation in power consumption of the light control device.

<Transmitted Image Sharpness>

Figure 5:
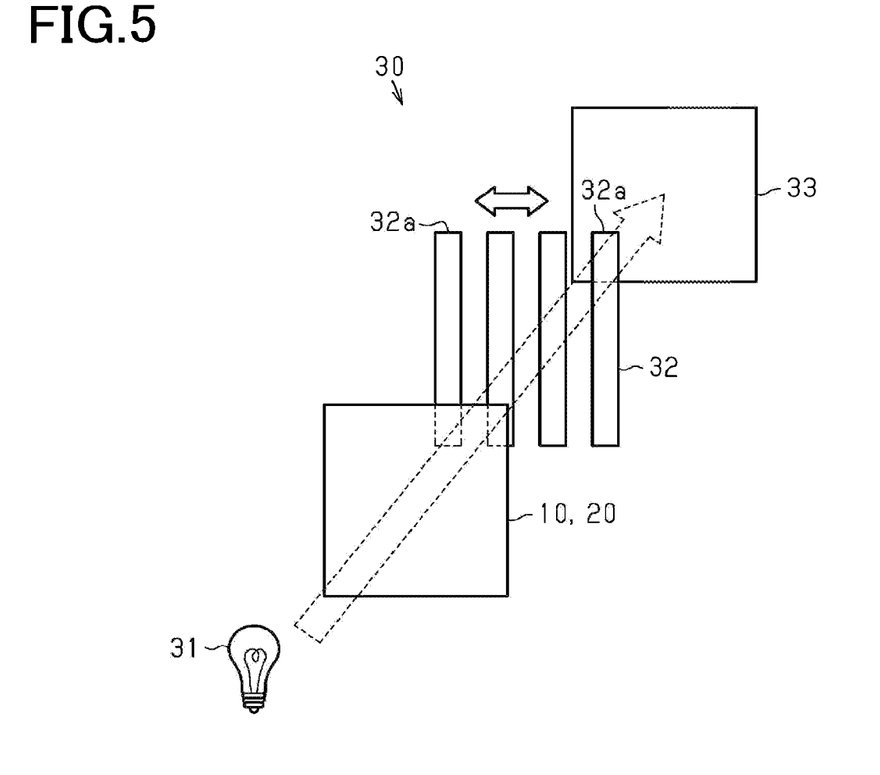
FIG. 5 is a schematic diagram illustrating a configuration of a transmitted image sharpness measurement device.
Figure 6:
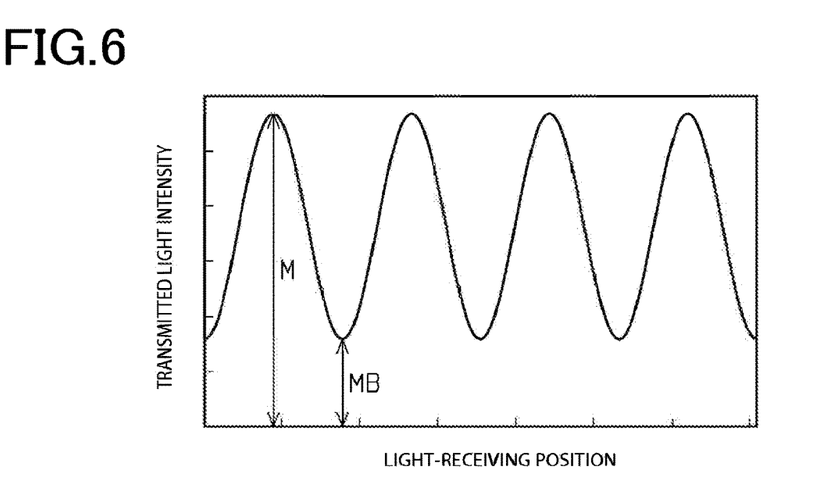
FIG. 6 is a graph illustrating a relationship between transmitted light intensity and light-receiving position in the transmitted image sharpness measurement device.

Referring now to FIGS. 5 and 6, a method of measuring transmitted image sharpness in an opaque state will be described. As mentioned above, the transmitted image sharpness is measured by a method according to JIS K 7374: 2000. In the normal type light control sheet 10, the state in which no voltage is applied to the light control layer 11 is an opaque state. In the reverse type light control sheet 20, the state in which a predetermined reference voltage is applied to the light control layer 11 is an opaque state.

FIG. 5 shows a measurement device 30 for measuring transmitted image sharpness, which includes a light source 31, an optical comb 32, and a light-receiving part 33. In the measurement device 30, the light control sheet 10 or 20, i.e., a measurement target, is placed between the light source 31 and the optical comb 32. When measuring transmitted image sharpness, the optical comb 32 moves at a constant speed parallel to a plane which is perpendicular to the direction in which the light source 31, the light control sheet, and the optical comb 32 are arranged. The optical comb 32 includes shields 32a for shielding light, each having a width in the moving direction of the optical comb 32 which is defined to be an optical comb width. In the optical comb 32, the width of each shield 32a is equal to the width of each slit in the direction in which the optical comb 32 moves. In the present embodiment, the optical comb width is 0.125 mm.

As shown in FIG. 6, the intensity of light passing through the optical comb 32, i.e., the intensity of light received by the light-receiving part 33, periodically changes. The maximum intensity of light received by the light-receiving part 33 is defined to be a maximum light intensity M, and similarly a minimum intensity of light is defined to be a minimum light intensity BM. The maximum light intensity M is obtained when the light that has passed through the light control sheet 10 or 20 is not shielded by the optical comb 32. The minimum light intensity BM is obtained when the light that has passed through the light control sheet 10 or 20 is shielded by the optical comb 32.

A transmitted image sharpness C(n) (%) when the optical comb width is n can be calculated from the following Formula (1) using the maximum light intensity M and the minimum light intensity MB.

$$C(n)=100\times(M-MB)/(M+MB) \qquad (1)$$

<Clarity>

Figure 7:
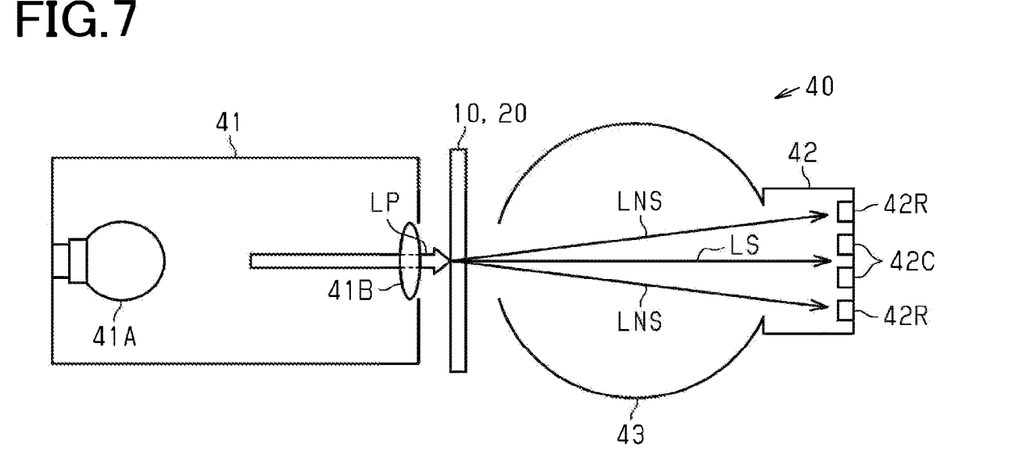
FIG. 7 is a schematic diagram illustrating a configuration of a clarity measurement device.

Referring to FIG. 7, a method of measuring clarity in an opaque state will be described. FIG. 7 is a schematic diagram illustrating an example of a measurement device used for measuring clarity. In the normal type light control sheet 10, the state in which no voltage is applied to the light control layer 11 is an opaque state. In the reverse type light control sheet 20, the state in which a predetermined reference voltage is applied to the light control layer 11 is an opaque state.

FIG. 7 shows a clarity measurement device 40, which includes an illumination part 41, a light-receiving part 42, and an integrating sphere 43. The illumination part 41 includes a light source 41A and a lens 41B. The light source 41A is a white LED, and the lens 41B converts the light emitted from the light source 41A into parallel light. The light-receiving part 42 includes a center sensor 42C and an outer peripheral sensor 42R. The center sensor 42C and the outer peripheral sensor 42R are concentrically formed in an annular shape. The outer peripheral sensor 42R is located on the outside of the center sensor 42C. The measurement device 40 can be used for measuring not only clarity but also haze of a measurement target. The integrating sphere 43 of the measurement device 40 is used only when measuring haze.

In the measurement device 40, the light control sheet 10 or 20, i.e., a measurement target, is placed between the illumination part 41 and the integrating sphere 43. The flux of parallel light LP emitted from the lens 41B has a diameter of 14 mm in the present embodiment. The light that has passed through the light control sheet 10 or 20 includes straight light LS propagating along the optical axis of the parallel light LP that has entered the light control layer 11, and narrow-angle scattered light LNS, which is light excluding the straight light LS, propagating at an angle in a range of +2.5° to −2.5° relative to the optical axis of the parallel light LP. The range of the angle formed between the straight light SL and the optical axis of the parallel light LP is determined so as to match, for example, the range in which the parallel light LP propagates without the light control sheet 10 or 20, that is, substantially 0°, based on the specification of the measurement device 40.

In the light-receiving part 42, the center sensor 42C receives the straight light LS, and the outer peripheral sensor 42R receives the narrow-angle scattered light LNS. Of the light that has passed through the light control layer 11, the intensity of the straight light LS received by the center sensor 42C is a center intensity LC, and the intensity of the narrow-angle scattered light LNS received by the outer peripheral sensor 42R is an outer peripheral intensity LR. Clarity is calculated from the following Formula (2).

$$100\times(LC-LR)/(LC+LR) \qquad (2)$$

As mentioned above, the haze of the light control sheet can be measured using the measurement device 40. The haze is measured using a method according to JIS K 7136:2000. When measuring haze using the measurement device 40, the light that has passed through the light control sheet is received by the light-receiving part disposed at the integrating sphere 43.

The term haze refers to a percentage of transmitted light that has passed through a measurement target and has deviated from the incident light by 2.5° or more due to forward scattering. In haze measurements, parallel light refers to light at an angle of less than ±2.5° relative to the optical axis of the parallel light LP, and wide-angle scattered light refers to light at an angle of ±2.5° or more. The transmittance of the wide-angle scattered light is defined to be a diffuse transmittance Td, the transmittance of the parallel light is defined to be a parallel transmittance Tp, and the sum of the parallel transmittance Tp and the diffuse transmittance Td is defined to be a total light transmittance Tt. In this case, haze is the ratio of the diffuse transmittance Td to the total light transmittance Tt.

As mentioned above, clarity and haze can be measured using the measurement device 40. Clarity and haze have properties different from each other in the light control sheet 10 or 20. Transmitted image sharpness and haze also have properties different from each other in the light control sheet 10 or 20. Transmitted image sharpness and clarity are parameters interchangeable with each other and have properties equal to each other in the light control sheet 10 or 20.

Haze indicates a property of the light control sheet 10 or 20 based on the wide-angle scattered light. Haze indicates the degree of turbidity of the light control sheet 10 or 20 as a whole, e.g., the degree of whiteness of the light control sheet 10 or 20 as a whole, perceived by the observer through visual inspection of the light control sheet 10 or 20. For example, as the degree of haze becomes higher in the light control sheet 10 or 20, the observation target appears to be blurred more to the observer.

Clarity indicates a property of the light control sheet 10 or 20 based on the narrow-angle scattered light. Clarity indicates the degree of sharpness of the boundary between the observation target and the outside of the observation target, or sharpness of fine portions of the observation target. For example, as the value of clarity of the light control sheet 10 or 20 becomes smaller, the contours of the observation target via the light control sheet 10 or 20 are blurred more, or in other words, sharpness of the observation target is reduced more.

If the opacity of the light control sheet 10 or 20 is defined in terms of haze, the observation target may have sharp contours or may have blurred contours, even when the degree of turbidity of the light control sheet 10 or 20 is sufficient. When the light control sheet 10 or 20 is visually inspected by the observer, the difference in the degree of blurring of the contours may be perceived by the observer as a difference in the degree of opacity. Consequently, there may be a discrepancy between the opacity due to haze and the opacity perceived through visual inspection.

If the opacity of the light control sheet 10 or 20 is defined in terms of the clarity range, the contours of the observation target may be blurred more as the value of clarity becomes smaller. Consequently, discrepancy between the opacity due to clarity and the opacity perceived through visual inspection can be minimized. Thus, if the value of clarity is in the above range (≤71%), blurring in the contours of the observation target is guaranteed. Such a light control sheet 10 or 20 is particularly useful if used when there is only a short distance between the light control sheet 10 or 20 and the observation target, or when the intensity of illumination applied to the observation target is high.

If the opacity of the light control sheet 10 or 20 is evaluated in terms of transmitted image sharpness, advantageous effects comparable to those obtained through the opacity evaluation in terms of clarity can be obtained. Specifically, according to transmitted image sharpness, discrepancy can be minimized between the opacity in terms of transmitted image sharpness and the opacity perceived through visual inspection.

<Average Domain Size>

Next, a method of measuring an average domain size will be described.

An average domain size can be calculated through observation of a cross section of the polymer network 11A using a scanning electron microscope. The polymer network 11A to be observed can be obtained by removing the liquid crystal composition 11B from the light control layer 11 sandwiched between the two transparent electrode layers 12.

For example, a rectangular plate-like sheet segment of 10 cm on each side may be cut out of the light control sheet 10 or 20. Next, the sheet segment is immersed in an organic solvent, such as isopropyl alcohol, which dissolves the liquid crystal composition 11B but does not dissolve the polymer network 11A to remove the liquid crystal composition 11B from the sheet segment.

Subsequently, a cross section of the sheet segment from which the liquid crystal composition 11B has been removed is imaged using a scanning electron microscope. In this case, an image with 1,000 times magnification may be captured using a scanning electron microscope for each of 30 rectangular areas arbitrarily selected from the cross section of the sheet segment. It should be noted that the rectangular areas are selected so that the distance between two adjacent rectangular areas is 1 mm or more.

Next, domain size is measured for ten domains 11D arbitrarily selected from one image. Then, an average domain size is calculated for eight domains after excluding the maximum and minimum values from the ten domain sizes, and the calculated average value is used as a representative domain size of the image. After that, an average value is calculated for the representative domain sizes of the images captured for the 30 areas, and the calculated value is used as an average domain size. In this case, for those domains 11D which have a circular shape in the images, their diameters are measured as their domain sizes. For those domains 11D which have an elliptical shape in the images, their major diameters are measured as their domain sizes. For those domains 11D which have an indefinite shape in the images, the diameters of the circles circumscribing the domains are measured as their domain sizes.

<Method of Controlling Light Control Sheet>

The method of controlling the light control sheet is used in the method of producing the light control sheet. In the method of controlling the light control sheet, it is determined whether the light control sheet is functioning normally. Requirements for determining the light control sheet as functioning normally include the above requirements 1 and 2.

The method of producing the light control sheet includes producing a rolled-up light control sheet satisfying the requirement 1 or producing a large-size light control sheet satisfying the requirement 1, and cutting out sheet segments from the produced light control sheet. Also, the method of producing the light control sheet includes measuring an average domain size in the cut-out sheet segments. Furthermore, the method of producing the light control sheet includes determining the light control sheet, with an average domain size satisfying the requirement 2, as functioning normally, and determining the light control sheet, with an average domain size not satisfying the requirement 2, as functioning abnormally.

According to this production method, opacity of the light control sheet can be controlled so that the contours of an observation target cannot be visually perceived, and the opacity can be prevented varying between light control sheets.

<Visual Inspection Evaluation>

Next, a description will be given of a relationship of haze, transmitted image sharpness and clarity with visually perceived opacity, for a light control sheet in an opaque state. The normal type light control sheet 10 and the reverse type light control sheet 20 have a similar relationship between these parameters and the visually perceived opacity. Therefore, the following description will explain evaluation using the normal type light control sheet 10.

Visually perceived opacity is evaluated by placing a fluorescent light LT with a light intensity of about 3,500 lm at a position 80 cm from the rear surface of a light control sheet in an opaque state, and visually inspecting the light control sheet at a position 20 cm from the front surface of the light control sheet. The observer's eye, a light control sheet, and the fluorescent light LT are arranged in alignment. Individual light control sheets 10 are ranked $1^{st}$, $2^{nd}$, $3^{rd}$, $4^{th}$ and $5^{th}$ in order from the level at which the fluorescent lamp LT is least perceived visually.

Transmitted image sharpness is a measured value obtained using an image clarity measurement device (ICM-1T manufactured by Suga Test Instruments Co., Ltd.) through a method according to JIS K 7374:2007. Haze is a measured value obtained using a haze meter (NDH7000SD manufactured by Nippon Denshoku Industries Co., Ltd.) through a method according to JIS K 7136:2000. Clarity is a measured value obtained using a haze/transparency measurement device (haze-gard i manufactured by BYK-Gardner GmbH).

Figure 8:
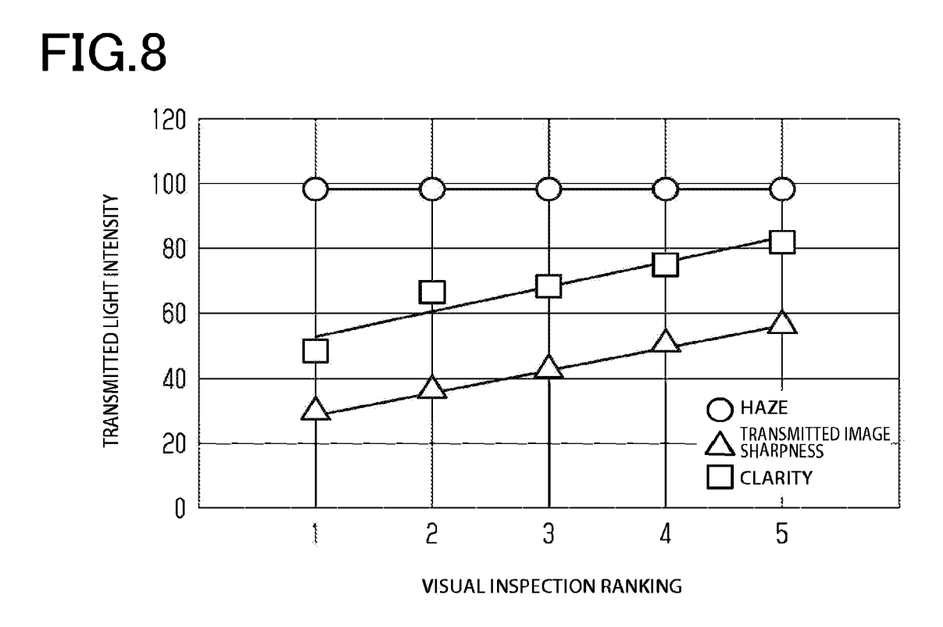
FIG. 8 is a graph illustrating ranking by visual inspection in terms of haze, transmitted image sharpness and clarity.

FIG. 8 shows measurements of haze, transmitted image sharpness and clarity in individual visual inspection ranks. FIG. 9 is a set of images in which (a), (b), (c), (d) and (e) show images of the light control sheets 10 of respective visual inspection ranks captured from the inspection side.

As shown in FIG. 8, the light control sheets 10 in descending order of the visual inspection ranking respectively have transmitted image sharpness of 30.4%, 36.5%, 42.6%, 51.5% and 56.2%. The light control sheets 10 in descending order of the visual inspection ranking respectively have clarity of 49.0%, 64.6%, 66.8%, 75.8% and 81.7%. Thus, the light control sheets 10 have lower clarity and lower transmitted image sharpness as they are ranked higher by visual inspection.

Figure 9A:
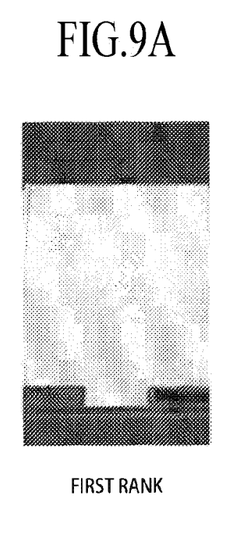
Figure 9B:
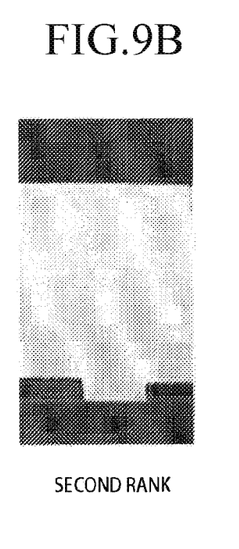
Figure 9C:
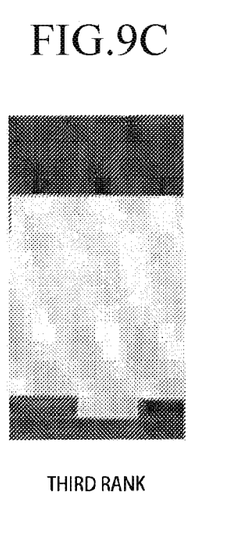
Figure 9D:
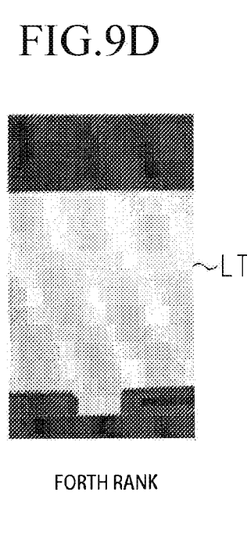
Figure 9E:
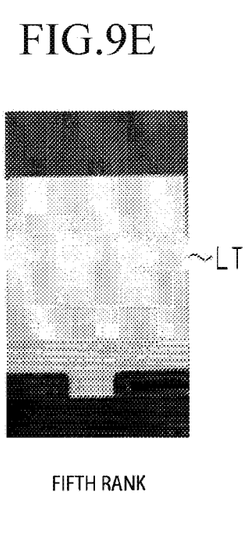

As shown in FIG. 9(a), substantially the entire surface of the first-rank light control sheet is white turbid, making the contours of the fluorescent light LT visually imperceptible. As shown in FIGS. 9(b) and 9(c), in the second- and third-rank light control sheets as well, it is difficult to visually perceive the contours of the fluorescent light LT, although whiteness is fading in portions of the sheets. In contrast, as shown in FIGS. 9(d) and 9(e), portions of the contours of the fluorescent light LT can be visually perceived in the fourth- and fifth-rank light control sheets. In particular, as shown in FIG. 9(e), the lower edge can be visually perceived in the contours of the fluorescent light LT in the fifth-rank light control sheet 10.

Thus, clarity and transmitted image sharpness match the visually perceived opacity in the ranges in which higher opacity can be imparted. If transmitted image sharpness is 47% or less, sufficient opacity can be obtained so that that the contours of the fluorescent light LT cannot be visually perceived. If clarity is 71% or less, sufficient opacity can be obtained so that the contours of the fluorescent light LT cannot be visually perceived.

Returning to FIG. 8, the light control sheets in descending order of the visual inspection ranking respectively have haze of 98.5%, 98.2%, 98.5%, 97.9% and 98.1%. Thus, haze has a considerably lower correlation with visual inspection ranking in the range in which higher opacity can be imparted. Haze does not match the visually perceived opacity in the range in which higher opacity can be imparted.

[Relationship Between Average Domain Size and Clarity]

Next, the relationship between average domain size of the light control sheet and clarity will be described. The normal type light control sheet 10 and the reverse type light control sheet 20 have a similar relationship between average domain size and clarity. Therefore, the following description will be given of an example in which the normal type light control sheet 10 is used.

First, mixtures 1 to 3 having different concentrations of liquid crystal composition were prepared as light control sheets 10. The concentration of the liquid crystal composition in the mixture 1 was 41.5%. The concentration of the liquid crystal composition in the mixture 2 was 42.5%. The concentration of the liquid crystal composition in the mixture 3 was 50.0%.

Next, using the mixture 1 in which the concentration of the liquid crystal composition was 41.5%, seven experimental examples having different average domain sizes were prepared by changing exposure conditions for forming the light control layers 11. Furthermore, using the mixture 2 in which the liquid crystal ratio was 42.5%, five experimental examples having different average domain sizes were prepared by changing exposure conditions for forming the light control layers 11. In addition, using the mixture 3 in which the concentration of the liquid crystal composition was 50.0%, five experimental examples having different average domain sizes were prepared by changing exposure conditions for forming the light control layers 11.

Figure 10:
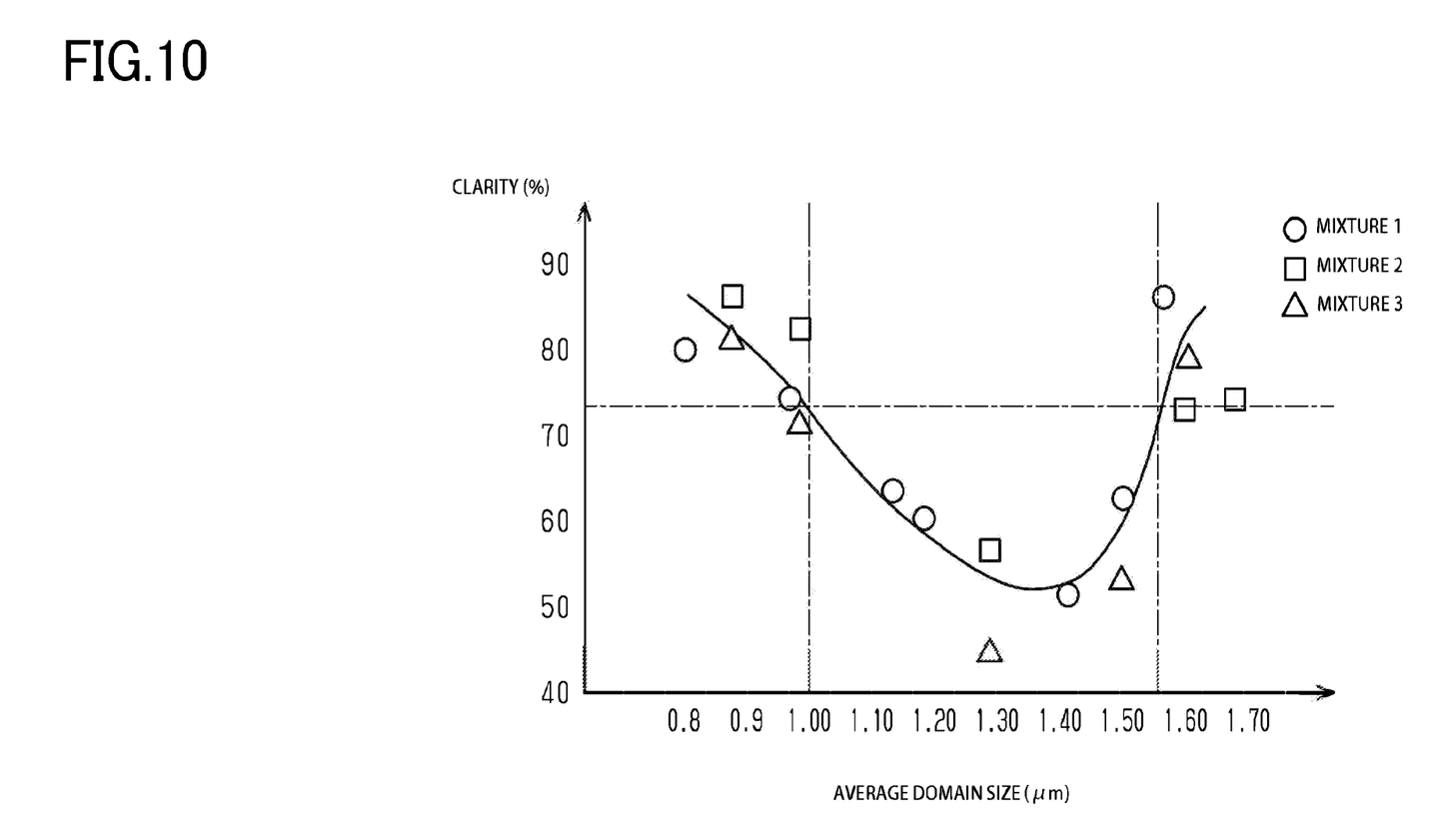
FIG. 10 is a graph illustrating a relationship between average domain size and clarity.

According to the method of measuring clarity described above, clarity was measured for the individual experimental examples using a haze/transparency measurement device (haze-gard i manufactured by BYK-Gardner GmbH). Also, according to the method of measuring an average domain size described above, average domain sizes were measured for the individual experimental examples. FIG. 10 shows a relationship of average domain size measurements with clarity measurements.

As shown in FIG. 10, when the average domain size is 1.54 μm in the light control sheets 10 of the mixture 1, clarity is 85.1%. When the average domain size is in the range of 1.40 μm or more and 1.54 μm or less, clarity decreases from 85.1% to 50% as the average domain size decreases. On the other hand, when the average domain size is in the range of 0.83 μm or more and 1.40 μm or less, clarity increases from 50% to 79.4% as the average domain size decreases.

Specifically, when the average domain size is 1.40 μm in the light control sheets 10 of the mixture 1, clarity is minimized. Also, values of clarity have a U-shaped curve with an average domain size 1.40 μm minimizing clarity at the bottom.

When the average domain size is 1.65 μm in the light control sheets 10 of the mixture 2, clarity is 73.0%. When the average domain size is in the range of 1.28 μm or more and 1.65 μm or less, clarity decreases from 73.0% to 56.5% as the average domain size decreases. On the other hand, when the average domain size is in the range of 0.90 μm or more and 1.28 μm or less, clarity increases from 56.5% to 86.2% as the average domain size decreases.

Specifically, when the average domain size is 1.28 μm in the light control sheets 10 of the mixture 2, clarity is minimized. Also, values of clarity have a U-shaped curve with an average domain size 1.28 μm minimizing clarity at the bottom.

When the average domain size is 1.58 μm in the light control sheets 10 of the mixture 3, clarity is 78.5%. When the average domain size is in the range of 1.28 µm or more and 1.58 µm or less, clarity decreases from 78.5% to 44.4% as the average domain size decreases. On the other hand, when the average domain size is in the range of 0.90 µm or more and 1.28 µm or less, clarity increases from 44.4% to 80.7% as the average domain size decreases.

Specifically, when the average domain size is 1.28 µm in the light control sheets 10 of the mixture 3, clarity is minimized. Also, values of clarity have a U-shaped curve with an average domain size 1.28 µm minimizing clarity at the bottom.

As shown in the above visual inspection evaluation, opacity that makes the contours of an observation target visually imperceptible is achieved when clarity is 71% or less. Furthermore, if the average domain size is 1.0 µm or more and 1.55 µm or less, opacity having a clarity of 71% or less and making the contours of an observation target visually imperceptible can be achieved. In addition, if the average domain size is 1.0 µm or more and 1.55 µm or less, clarity is minimized in the vicinity of the center of this range. Thus, a large number of domains 11D, even if they are varied in size, can be easily distributed within a size that produces opacity that makes the contours of the observation target visually imperceptible. Consequently, opacity variation can be minimized in the light control sheet.

According to the above embodiment, the advantageous effects enumerated below can be achieved.

(1) As long as the light control sheet 10 or 20 satisfies the requirements 1 and 2, a large number of domains 11D can be distributed within a range that produces opacity that makes the contours of the observation target visually imperceptible. Consequently, opacity variation can be minimized in the light control sheet 10 or 20.

(2) Since the clarity of the light control sheet 10 or 20 is 71% or less, a light control sheet 10 or 20 that can sufficiently make the contours of the observation target visually imperceptible can be obtained, with the opacity variation being minimized.

(3) Since the transmitted image sharpness of the light control sheet 10 or 20 is 47% or less, a light control sheet 10 or 20 that can sufficiently make the contours of the observation target visually imperceptible can be obtained, with the opacity variation being minimized.

(4) In the reverse type light control sheet 20 in particular, minimization in opacity variation of the light control sheet 20 can contribute to controlling the opacity by changing the applied voltage, and further, can contribute to minimizing complication in the structure and initial setting of the drive device and minimizing variation in power consumption of the light control device.

The embodiment described above may be modified and implemented as follows.

The light control sheet 10 or 20 may further include barrier layers that cover the end faces of the light control layer 11, the surfaces of the transparent electrode layers 12, and the like. The barrier layers may have a gas barrier function and/or a UV barrier function.

The light control sheet 10 or 20 may further include light transmissive substrates having a function of enhancing mechanical strength of the light control sheet. Examples of the material forming the light transmissive substrates may include transparent inorganic materials, such as glass and silicone; and transparent organic materials, such as a polymethacrylic acid ester resin, polyethylene, polystyrene, polyethylene terephthalate, polyvinyl alcohol, polycarbonate, polyvinyl chloride, polyimide, and polysulfone.

In the normal type light control sheet 10, the opaque state of the light control layer 11 may be achieved by applying a voltage that is lower than in the transparent state.

The light control device may further include a control unit that changes the opacity of the light control sheet 10 or 20 between a first opacity with a clarity of 71% or less and a second opacity with a clarity of more than 71%. The control unit that controls driving of the light control sheet 10 or 20 may include information, such as a table, for converting each different value of clarity into a voltage, so that the control unit can apply a voltage to the drive circuit 10D which is correlated to the clarity specified such as by an external operation device. According to the light control device including these control units, the opacity of the light control sheet 10 or 20 can be changed between an opacity preventing visual perception and an opacity enabling visual perception. Therefore, the opacity desired by the user of the light control device can be achieved by the light control device.

The drive circuit 10D provided to the light control device may apply an equal voltage to two different light control sheets so that an equal voltage can be applied between the transparent electrode layers of each light control sheet. Opacity variation is minimized in these light control sheets 20, and thus the configuration of applying an equal voltage can contribute to achieving equal opacity between the two light control sheets. Since this configuration can omit the function of changing voltage for each light control sheet, the drive circuit 10D can have a simpler structure.

The present application addresses the following. Transmitted image sharpness and clarity are greatly affected by the degree of narrow-angle scattering occurring in light control sheets. It remains unexplained; however, how transmitted image sharpness and clarity are affected by the components of the polymer layer. Light control devices on which light control sheets are mounted are required to have predetermined opacity. Therefore, voltage applied to the light control sheets is controlled so that transmitted image sharpness and clarity will have predetermined values. For example, if a space is defined between two light control sheets, one of the two light control sheets is driven with a predetermined voltage, while the other light control sheet is driven with a voltage higher than the predetermined voltage to maintain clarity at 80% or less, so that privacy of the persons present in the space can be protected. However, opacity control based on the change of applied voltage involves use of drivers having complicated structures which require complicated initial setting, and causes great variation in power consumption of the light control devices.

The present application has an aspect to provide a light control sheet capable of reducing or preventing opacity variation of light control sheets, a light control device, and a method of controlling the light control sheet.

A light control sheet includes a light control layer that is configured to change state between a transparent state and an opaque state, and two transparent electrode layers that sandwich the light control layer. In the light control sheet, the light control layer includes a transparent polymer layer that contains a plurality of domains, and a liquid crystal composition filling the plurality of domains. The liquid crystal composition in the light control layer has a concentration of 37% or more and 55% or less, and the domains have an average size of 1.0 µm or more and 1.55 µm or less.

The inventors of the present invention found that if an average domain size is reduced under conditions where the concentration of a liquid crystal composition is 37% or more and 55% or less, transmitted image sharpness and clarity can be minimized. Specifically, the inventors of the present invention found that minimum values of transmitted image sharpness and clarity reside in the vicinity of the center of an average domain size range of 1.0 µm or more and 1.55 µm or less.

The liquid crystal composition in each domain of the light control layer is an element contributing to the opacity of the light control sheet. If a light control sheet contains a liquid crystal composition with a concentration of 37% or more and 55% or less and includes domains with an average size of 1.0 µm or more and 1.55 µm or less, the size of each element contributing to opacity and the number of elements per unit volume can be approximately specified. In the vicinity of the center of the average domain size range of 1.0 µm or more and 1.55 µm or less, the values of transmitted image sharpness and clarity are minimized. Thus, a large number of domains, even if they are varied in size, can be easily distributed, satisfying the requirements for achieving predetermined opacity. The predetermined opacity is opacity that makes the contours of an observation target visually imperceptible. Consequently, opacity that makes the contours of an observation target visually imperceptible can be obtained, and the opacity variation can be minimized.

A light control device for solving the above issues includes the light control sheet described above, and a drive circuit that drives the light control sheet.

A method of controlling a light control sheet for solving the above issues is a method of controlling a light control sheet that includes a light control layer that is configured to change state between a transparent state and an opaque state, and two transparent electrode layers that sandwich the light control layer. In the light control sheet, the light control layer includes a transparent polymer layer that contains a plurality of domains, and a liquid crystal composition filling the plurality of domains. The method includes determining whether the light control layer is functioning normally, based on requirements which include the liquid crystal composition in the light control layer having a concentration of 37% or more and 55% or less, and the domains having an average size of 1.0 µm or more and 1.55 µm or less.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
    a light control layer switchable between a transparent state and an opaque state; and
    a plurality of transparent electrode layers sandwiching the light control layer such that the plurality of transparent electrode layers is configured to apply voltage to the light control layer for switching between the transparent state and the opaque state,
    wherein the light control layer includes a liquid crystal composition and a transparent polymer layer having a polymer network such that the polymer network is forming a plurality of domains having an average size set in a range of 1.0 µm to 1.55 µm and that the liquid crystal composition is filling the plurality of domains in the transparent polymer layer and has a concentration in a range of 37% to 55%, the light control sheet has a clarity of 71% or less when the light control layer is in the opaque state, and the clarity is calculated by formula 100×(LC−LR)/(LC+LR) where LC is an intensity of straight light propagating along an optical axis of parallel light incident on the light control sheet in light passing through the light control sheet, and LR is an intensity of narrow-angle scattered light propagating at an angle in a range of +2.5° to −2.5° relative to the optical axis of the parallel light.

2. The light control sheet according to claim 1, wherein the light control sheet has a transmitted image sharpness of 47% or less when the light control layer is in the opaque state, where the transmitted image sharpness of the light control sheet is in accordance with JIS K 7374:2007 and is a transmitted image sharpness when an optical comb width is 0.125 mm.

3. The light control sheet according to claim 1, wherein the light control layer is in an opaque state when a voltage is applied by the plurality of transparent electrode layers across the transparent polymer layer.

4. The light control sheet according to claim 2, wherein the light control layer is in an opaque state when a voltage is applied by the plurality of transparent electrode lavers across the transparent polymer layer.

5. A light control device, comprising:
    the light control sheet of claim 1; and
    a drive circuit configured to drive the light control sheet.

6. A method of controlling a light control sheet, comprising:
    testing an operational status of a light control layer in a light control sheet,
    wherein the light control sheet includes the light control layer switchable between a transparent state and an opaque state, and a plurality of transparent electrode layers sandwiching the light control layer such that the plurality of transparent electrode layers is configured to apply voltage to the light control layer for switching between the transparent state and the opaque state, the light control layer includes a liquid crystal composition and a transparent polymer layer having a polymer network such that the polymer network is forming a plurality of domains and that the liquid crystal composition is filling the plurality of domains in the transparent polymer layer, the testing includes detecting whether the liquid crystal composition in the light control layer has a concentration of in a range of 37% to 55%, and measuring whether the plurality of domains has an average size in a range of 1.0 µm to 1.55 µm, and the light control sheet has a clarity of 71% or less when the light control layer is in the opaque state, and the clarity is calculated by formula 100×(LC−LR)/(LC+LR) where LC is an intensity of straight light propagating along an optical axis of parallel light incident on the light control sheet in light passing through the light control sheet, and LR is an intensity of narrow-angle scattered light propagating at an angle in a range of +2.5° to −2.5° relative to the optical axis of the parallel light.

7. The light control sheet according to claim 1, further comprising:
    a plurality of alignment layers formed on the light control layer such that the alignment layers are positioned between surfaces of the light control layer and the transparent electrode layers, respectively.

8. The light control sheet according to claim 7, wherein the light control sheet has a transmitted image sharpness of 47% or less when the light control layer is in the opaque state, where the transmitted image sharpness of the light control sheet is in accordance with JIS K 7374:2007 and is a transmitted image sharpness when an optical comb width is 0.125 mm.

9. The light control sheet according to claim 7, wherein the light control layer is in an opaque state when a voltage is applied by the plurality of transparent electrode layers across the transparent polymer layer.

10. The light control sheet according to claim 8, wherein the light control layer is in an opaque state when a voltage is applied by the plurality of transparent electrode layers across the transparent polymer layer.

11. The light control sheet according to claim 1, further comprising:
a plurality of transparent substrates formed on the plurality of transparent electrode layers respectively such that the plurality of transparent substrates is sandwiching the plurality of transparent electrode layers.

12. The light control sheet according to claim 7, further comprising:
a plurality of transparent substrates formed on the plurality of transparent electrode layers respectively such that the plurality of transparent substrates is sandwiching the plurality of transparent electrode layers.

13. The light control sheet according to claim 2, further comprising:
a plurality of transparent substrates formed on the plurality of transparent electrode layers respectively such that the plurality of transparent substrates is sandwiching the plurality of transparent electrode layers.

14. The light control sheet according to claim 3, further comprising:
a plurality of transparent substrates formed on the plurality of transparent electrode layers respectively such that the plurality of transparent substrates is sandwiching the plurality of transparent electrode layers.

15. The light control sheet according to claim 4, further comprising:
a plurality of transparent substrates formed on the plurality of transparent electrode layers respectively such that the plurality of transparent substrates is sandwiching the plurality of transparent electrode layers.

16. The light control sheet according to claim 6, further comprising:
a plurality of transparent substrates formed on the plurality of transparent electrode layers respectively such that the plurality of transparent substrates is sandwiching the plurality of transparent electrode layers.

17. The light control sheet according to claim 1, wherein the light control sheet has a haze of 95% or more when the light control layer is in the opaque state, where the haze is in accordance with JIS K 7136:2000.

18. The light control sheet according to claim 2, wherein the light control sheet has a haze of 95% or more when the light control layer is in the opaque state, where the haze is in accordance with JIS K 7136:2000.

19. A light control device, comprising:
the light control sheet of claim 7; and
a drive circuit configured to drive the light control sheet.

20. A light control device, comprising:
the light control sheet of claim 12; and
a drive circuit configured to drive the light control sheet.

* * * * *